United States Patent
Kris

(10) Patent No.: US 7,157,890 B1
(45) Date of Patent: Jan. 2, 2007

(54) USING PULSE WIDTH MODULATION IN THE CONTROL OF LOAD SHARING BETWEEN PARALLELED POWER SUPPLIES

(75) Inventor: Bryan Kris, Phoenix, AZ (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 11/385,374

(22) Filed: Mar. 21, 2006

Related U.S. Application Data

(60) Provisional application No. 60/729,989, filed on Oct. 25, 2005.

(51) Int. Cl.
*G05F 1/595* (2006.01)
(52) U.S. Cl. ......................... 323/272; 363/65
(58) Field of Classification Search ................ 323/268, 323/271, 272, 282, 283, 285; 363/65; 307/82
See application file for complete search history.

(56) References Cited

U.S. PATENT DOCUMENTS

| | | | |
|---|---|---|---|
| 6,009,000 A * | 12/1999 | Siri | 363/21.09 |
| 6,614,133 B1 * | 9/2003 | Belson et al. | 307/58 |
| 6,768,658 B1 * | 7/2004 | Perry | 363/65 |
| 6,850,425 B1 * | 2/2005 | Tan et al. | 363/65 |

* cited by examiner

*Primary Examiner*—Gary L Laxton
(74) *Attorney, Agent, or Firm*—Baker Botts L.L.P.

(57) ABSTRACT

A plurality of power supply modules having their outputs coupled in parallel are controlled for load balancing purposes through a direct current bus having filtered pulse width modulation (PWM) signals representative of the power outputs of each of the plurality of power supply modules. A local PWM signal for each of the plurality of power supply modules is filtered to a DC voltage and used to compare with an average power required from each of the plurality of power supply modules.

20 Claims, 2 Drawing Sheets

USING PULSE WIDTH MODULATION IN THE CONTROL OF LOAD SHARING BETWEEN PARALLELED POWER SUPPLIES

RELATED PATENT APPLICATION

This application claims priority to commonly owned U.S. Provisional Patent Application Ser. No. 60/729,989; filed Oct. 25, 2005; entitled "Using Pulse Width Modulation in the Control of Load Sharing Between Paralleled Power Supplies," by Bryan Kris; which is hereby incorporated by reference herein for all purposes.

TECHNICAL FIELD

The present disclosure relates to control of load sharing between paralleled power supplies, and more particularly, to using pulse width modulation (PWM) in the control of load sharing between the paralleled power supplies.

BACKGROUND

Many large electronic systems, e.g., compute servers, disk storage arrays, telecommunications installations, etc., require large amounts of operating power and this operating power must be highly reliable. A common approach for system designers is to implement a system power supply as a plurality of smaller power supply modules. The outputs of the plurality of smaller power supply modules are connected together in parallel to provide the operating power required. Usually there are more power supply modules in the system power system than required to supply the existing load. This arrangement enables removal (e.g., unplugging) of faulty power supply modules while the electronic system is operational and may not impact the operation thereof. Replacement power supply modules, e.g., new or repaired, may be plugged back into the system power supply to maintain a desired amount of redundant power supply capacity.

When the power supply module outputs are connected in paralleled, it is impossible to insure that each parallel connected power supply module has the same output voltage. There are always tolerances in wiring, voltage references, temperatures, and other factors that may cause the output voltages to differ slightly between the power supply modules. Therefore one or more of the power supply modules having a slightly higher output voltage, will tend to supply the bulk of the system load. Therefore, some of the power supply modules may be operating at full power while others may be providing almost no power. The power supply module operating at full power will be hotter and therefore more failure prone. The power supply modules that are operating at full power are "saturated" and can not supply additional power if there is a load transient. Also, the other power supply modules that are supplying little or no power may not be operating in an ideal state for a switch mode converter power supply. A lightly loaded power supply module may not have a desired response to a transient load. For optimum reliability and performance, each of the power supply modules should carry an evenly distributed share of the system load.

Attempts at achieving an evenly distributed share of the system load between the power supply modules has been implemented by using analog signaling. For example, a "master" device (controller) may monitor the total load and then may issue analog commands to each of the power supply modules in an effort spread the workload evenly among these power supply modules. The master control device may provide a voltage that represents a target power output goal for each power supply module. This master control device control voltage to each of the modules may be an analog voltage that may be used to adjust the power supply module's reference voltage and thereby may adjust the resultant output power from the module. This type of power flow signaling control may be prone to a single point failure. If the master controller fails, the power supply system may become unusable and/or inoperative.

Most modern technology power supplies use switching regulators that are controlled with digital circuits. In order to generate an analog control signal, a digital-to-analog converter (DAC) is needed to create an analog power indication signal. DACs may be large and expensive to implement into a power supply system.

SUMMARY

There is a need for a less expensive implementation for load balancing (e.g., load sharing) of parallel connected power supply modules. Therefore, eliminating the requirement for a digital-to-analog converter (DAC) to generate an analog load signal for each power supply module will reduce the size, cost and complexity of the power supply module. According to the present disclosure, load sharing between power supply modules having paralleled outputs may be achieved by using pulse width modulation (PWM) generated load indication signals and a few inexpensive discrete passive components, e.g., resistors and capacitors for each of the power supply modules. The PWM signals may be generated by a digital integrated circuit controller, e.g., microcontroller, of the power supply module. This digital integrated circuit controller may be used for controlling the switching power transistors so that the PWM signal functions for load sharing are a trivial cost addition to the overall cost of the power supply module.

According to a specific example embodiment of the present disclosure, a power supply system may comprise a plurality of power supply modules, each of the plurality of power supply modules having an output coupled in parallel; each of the power supply modules has a controller for controlling the power output thereof; each controller has a first analog input, a second analog input, a first pulse width modulation (PWM) output, and a second PWM output; the second PWM output is used to represent a power output of an associated one of the power supply modules and is coupled to a power output averaging circuit that generates a first signal representative of an average power desired from each of the plurality of power supply modules; the second analog input is coupled to the first PWM output through a low pass filter; and the first analog input is coupled to the first signal representative of the average power desired from each of the plurality of power supply modules.

BRIEF DESCRIPTION OF THE DRAWINGS

A more complete understanding of the present disclosure thereof may be acquired by referring to the following description taken in conjunction with the accompanying drawings wherein.

Figure 1:
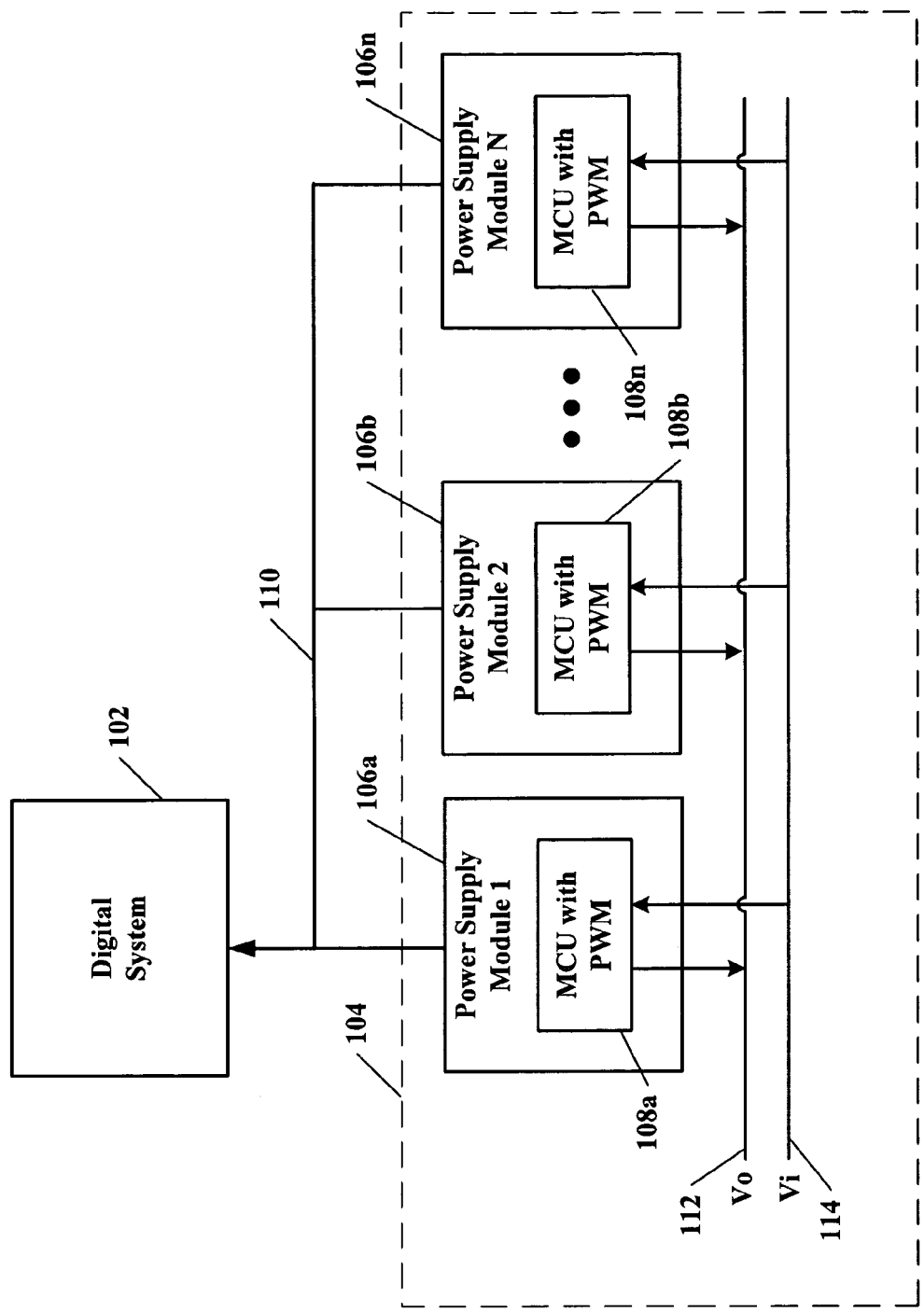
FIG. 1 illustrates a schematic block diagram of a plurality of power supply modules having their outputs connected in parallel and using an analog bus for load sharing, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a plurality of power supply modules having their outputs connected in parallel and using an analog bus for load sharing, according to a specific example embodiment of the present disclosure. A digital system 102, e.g., computer server, may be powered from a power supply system 104. The power supply system 104 may be comprised of a plurality of power supply modules 106. Each of the plurality of power supply modules 106 may have its power output coupled to a power bus 110. The power bus 110 is also coupled to the digital system 102. The power bus 110 may have more then one operating voltage (not shown) thereon.

Each of the plurality of power supply modules 106 may have a microcontroller 108. The microcontroller 108 may have a plurality of analog inputs (e.g., inputs 216 and 218, see FIG. 2) and a plurality of pulse width modulation (PWM) capable outputs (e.g., outputs 220 and 222, see FIG. 2). An analog bus 112, Vo, may carry analog signals representative of output current values of each of the power supply modules 106. An analog bus 114, Vi, may be connected to an analog input 216 (FIG. 2) of each of the microcontrollers 108. Wherein an analog signal representative of an average value of the sum of the output current values of the power supply modules 106 may be distributed on the analog bus 114 to each analog input 216 of the microcontrollers 108. This analog signal representing an average current value may be used in determining an appropriate current output value for each of the power supply modules 106.

Figure 2:
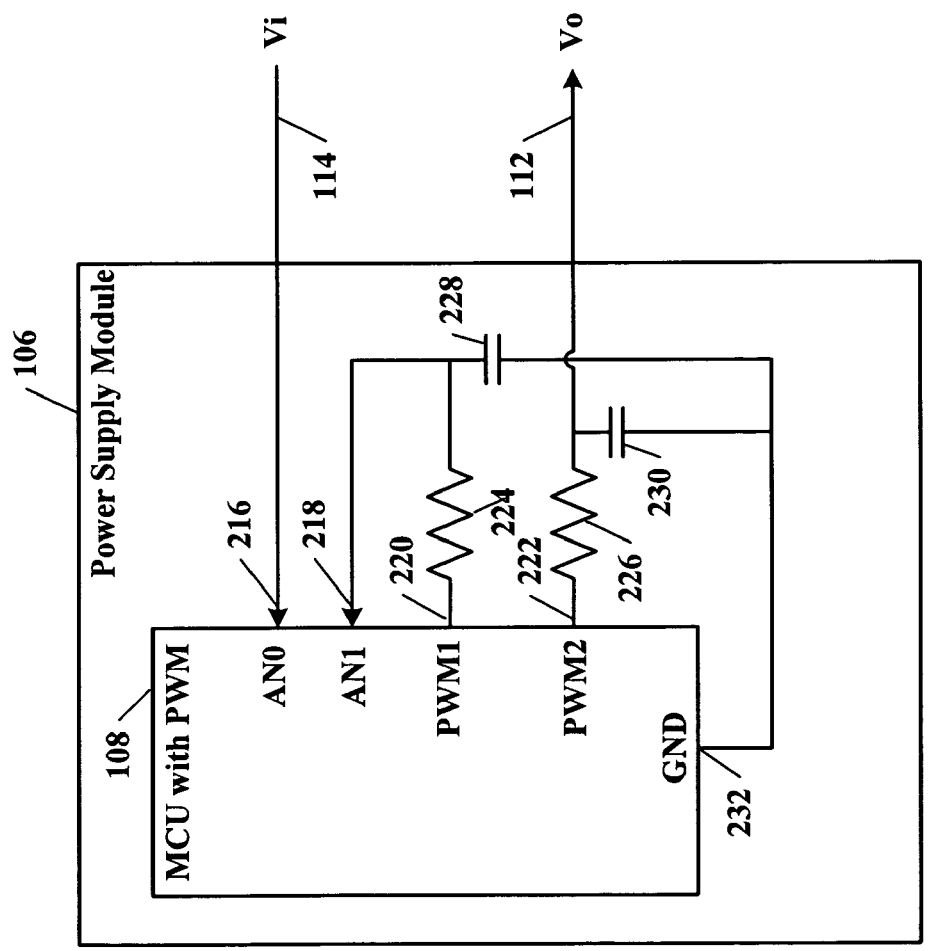
FIG. 2 illustrates a more detailed schematic block diagram of a power supply module of FIG. 1.

Referring now to FIG. 2, depicted is a more detailed schematic block diagram of a power supply module of FIG. 1. The power supply module 106 may be comprised of a power voltage regulator, e.g., switching transistors (not shown), that may be controlled by a microcontroller 108. The microcontroller 108 may have a first analog input 216, a second analog input 218, a first pulse width modulation (PWM) output 220, and a second pulse width modulation (PWM) output 222. The analog bus 114 may be coupled to the first analog input 216.

A first resistor-capacitor (RC) low pass filter comprising resistor 224 and capacitor 228 may be used to reduce the PWM signal at the output 220 to a substantially analog direct current (DC) voltage value. A second resistor-capacitor (RC) low pass filter comprising resistor 226 and capacitor 230 may be used to reduce the PWM signal at the output 222 to a substantially analog direct current (DC) value. The first and second low pass filters may have time constants of, for example but not limited to, about one ten thousandth (1/10,000) of the PWM frequency. This may reduce the PWM ripple voltage by about 80 dB (e.g., 20 dB per decade with four decades of frequency).

The first PWM signal (at output 220) may be coupled to the second input 218 through the first low pass filter (resistor 224 and capacitor 228). The filtered substantially DC signal voltage at the second input 218 may be converted to a digital value with an internal analog-to-digital converter (ADC) of the microcontroller 108. The DC signal voltage at the second input 218 may be used as a reference voltage to compensate for the non-ideal characteristics of the PWM output drivers and any local variations of the associated power supply module 106.

The second PWM signal (at output 222) may be coupled to the analog bus 112 through the second low pass filter (resistor 226 and capacitor 230). The analog bus 112 may interconnect all of the power supply modules 106 with a analog signal representation of a consensus or average power desired from each of the power supply modules 106. The desired average power signal may be obtained by, for example but not limited, to a voltage summing circuit and a voltage divider that may divide the sum of the voltages by the number of connected power supply modules 106.

The microcontroller 108 may calculate a difference between the reference DC voltage filtered PWM signal (at input 218) and the voltage on the bus 114 representative of the average power desired from each of the power supply modules 106. This calculated difference may be used to adjust the output power voltage of an associated power supply module 106 slightly higher or lower so as to substantially match the average power and thus have each of the power supply modules 106 deliver their fair share of power to the load (e.g., digital system 102).

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A power supply system, comprising:
   a plurality of power supply modules, each of the plurality of power supply modules having a power output coupled in parallel;
   each of the power supply modules has a controller for controlling the power output thereof;
   each controller has a first analog input, a second analog input, a first pulse width modulation (PWM) output, and a second PWM output;
   wherein the second PWM output represents a power output of an associated one of the plurality of power supply modules and is coupled to a power averaging circuit that generates a first signal representative of an average power desired from each of the plurality of power supply modules;
   the second analog input is coupled to the first PWM output through a first low pass filter, wherein the first low pass filter produces a reference voltage on the second analog input;
   and the first analog input is coupled to the first signal representative of the average power desired from each of the plurality of power supply modules.

2. The power supply system according to claim 1, wherein the first low pass filter is a resistor-capacitor low pass filter.

3. The power supply system according to claim 1, wherein the first low pass filter reduces a ripple voltage from the first PWM output by about 80 decibels.

4. The power supply system according to claim 1, wherein the first signal is the sum of the power outputs of the associated ones of the plurality of power supply modules divided by the number of power supply modules.

5. The power supply system according to claim 4, wherein each of the second PWM outputs are coupled to the power output averaging circuit through a second low pass filter.

6. The power supply system according to claim 5, wherein the second low pass filter is a resistor-capacitor low pass filter.

7. The power supply system according to claim 5, wherein the second low pass filter reduces a ripple voltage from the second PWM output by about 80 decibels.

8. The power supply system according to claim 1, wherein the paralleled power outputs are coupled to a digital system.

9. The power supply system according to claim 1, wherein the controller is a microcontroller.

10. The power supply system according to claim 1, wherein the first signal and reference voltage are compared in the controller so as to compensate for characteristic variations of each of the plurality of power supply modules.

11. A digital system having redundant power supplies, said system comprising:
   a plurality of power supply modules, each of the plurality of power supply modules having a power output coupled in parallel to a digital system;
   each of the power supply modules has a controller for controlling the power output thereof;
   each controller has a first analog input, a second analog input, a first pulse width modulation (PWM) output, and a second PWM output;
   wherein the second PWM output represents a power output of an associated one of the plurality of power supply modules and is coupled to a power output averaging circuit that generates a first signal representative of an average power desired from each of the plurality of power supply modules;
   the second analog input is coupled to the first PWM output through a first low pass filter, wherein the first low pass filter produces a reference voltage on the second analog input;
   and the first analog input is coupled to the first signal representative of the average power desired from each of the plurality of power supply modules.

12. The digital system according to claim 11, wherein the controller is a microcontroller.

13. The digital system according to claim 11, wherein the first low pass filter is a resistor-capacitor low pass filter.

14. The digital system according to claim 11, wherein the first signal is the sum of the power outputs of the associated ones of the plurality of power supply modules divided by the number of power supply modules.

15. The digital system according to claim 14, wherein each of the second PWM outputs are coupled to the power output averaging circuit through a second low pass filter.

16. The digital system according to claim 15, wherein the second low pass filter is a resistor-capacitor low pass filter.

17. The digital system according to claim 11, wherein the first signal and reference voltage are compared in the controller so as to compensate for characteristic variations of each of the plurality of power supply modules.

18. A method for balancing power outputs for a plurality of power supply modules in a power supply system, said method comprising the steps of:
   coupling in parallel power outputs from a plurality of power supply modules;
   providing a first analog input and a second analog input to a controller associated with each of the plurality of power supply modules;
   providing a first pulse width modulation (PWM) output and a second PWM output from each of the controllers, wherein the second PWM output represents a power output of an associated one of the plurality of power supply modules, and the first PWM output represents a reference value for the associated one of the plurality of power supply modules;
   coupling the second analog input to the first PWM output through a first low pass filter;
   providing a power output averaging circuit for generating a first signal representative of an average power desired from each of the plurality of power supply modules; and
   coupling the first analog input to the first signal representative of the average power desired from each of the plurality of power supply modules.

19. The method according to claim 18, wherein the first signal is determined by summing the power outputs of the associated ones of the plurality of power supply modules and dividing the sum of the power outputs by the number of power supply modules.

20. The method according to claim 18, further comprising the step of comparing the first signal and the reference value so as to compensate for characteristic variations of each of the plurality of power supply modules.

* * * * *